United States Patent
Engel et al.

(10) Patent No.: US 7,740,226 B2
(45) Date of Patent: Jun. 22, 2010

(54) ELECTROMAGNETIC ACTUATOR AND OPERATING ARRANGEMENT FOR OPERATION OF A VALVE ARRANGEMENT

(75) Inventors: Markus Engel, Neufra (DE); Horst Franke, Oberstaufen (DE)

(73) Assignees: Rolf Prettl, Tuebingen (DE); Robert Bosch GmbH, Stuttgart (DE)

(*) Notice: Subject to any disclaimer, the term of this patent is extended or adjusted under 35 U.S.C. 154(b) by 708 days.

(21) Appl. No.: 11/657,213

(22) Filed: Jan. 23, 2007

(65) Prior Publication Data
US 2007/0199527 A1    Aug. 30, 2007

(30) Foreign Application Priority Data
Jan. 23, 2006   (DE) .................. 10 2006 003 987

(51) Int. Cl.
*F16K 31/12* (2006.01)
(52) U.S. Cl. .............. 251/129.2; 251/78; 251/238; 251/242
(58) Field of Classification Search ............. 251/77, 251/78, 129.15, 129.2, 231, 236, 237, 238, 251/242
See application file for complete search history.

(56) References Cited

U.S. PATENT DOCUMENTS

| | | | | |
|---|---|---|---|---|
| 4,268,009 A | * | 5/1981 | Allen, Jr. ................ | 251/129.2 |
| 4,291,860 A | * | 9/1981 | Bauer .................... | 251/129.02 |
| 4,425,767 A | * | 1/1984 | Barbier .................. | 62/212 |
| 4,786,030 A | * | 11/1988 | Greiner et al. ........ | 251/129.15 |
| 4,840,193 A | * | 6/1989 | Schiel ................... | 137/627.5 |
| 7,226,034 B2 | * | 6/2007 | Stark et al. ........... | 251/76 |

FOREIGN PATENT DOCUMENTS

| | | |
|---|---|---|
| DE | 2 117 579 | 11/1971 |
| DE | 92 00 549 U1 | 3/1992 |
| WO | WO 2005/108840 | 11/2005 |

OTHER PUBLICATIONS

"Kraftfahrtechnisches Taschenbuch" BOSCH, 25th Edition, 2003, pp. 142, 143, 718-721 (with corresponding pp. 122-127 of "Automotive Handbook" BOSCH. Abstract of pp. 718-721.
European Search Report for DE 07000524.4 dated May 21, 2007.

* cited by examiner

*Primary Examiner*—John K Fristoe, Jr.
(74) *Attorney, Agent, or Firm*—Knobbe Martens Olson & Bear LLP

(57) ABSTRACT

An electromagnetic actuator is disclosed. The actuator has a coil arrangement which can be excited electrically, and has an armature. The armature is mounted such that it can move axially in the coil arrangement, is composed of soft magnetic material, and is moved in the axial direction when the coil arrangement is excited. A guide sleeve is fixed in the coil arrangement and guides the armature in the axial direction. The guide sleeve is produced from a soft magnetic material.

15 Claims, 2 Drawing Sheets

ELECTROMAGNETIC ACTUATOR AND OPERATING ARRANGEMENT FOR OPERATION OF A VALVE ARRANGEMENT

BACKGROUND OF THE INVENTION

1. Field of the Invention

The field relates to an electromagnetic actuator, in particular for valve arrangements, having a coil arrangement which can be excited electrically, having an armature which is mounted such that it can move axially in the coil arrangement, being composed of soft magnetic material and is moved in the axial direction when the coil arrangement is excited, and having a guide sleeve, which is fixed in the coil arrangement and guides the armature in the axial direction.

Furthermore, the field relates to an operating arrangement for operation of a valve arrangement, having a valve control element which can be moved with a linear actuator in an axial direction between a first actuating position and a second actuating position, in particular with an electromagnetic actuator as described above.

2. Description of the Related Art

An electromagnetic actuator of the type described above is in general also referred to as a switching magnet and is disclosed, for example, in "Kraftfahrtechnisches Taschenbuch" [Automotive Handbook], BOSCH, 25th Edition, 2003, pages 142, 143.

In electromagnetic actuators such as these, a working air gap is formed between the armature and a core (which may be part of a magnetic return-path device). When the coil arrangement is excited, a force is exerted on the armature, depending on the length of the working air gap. The characteristic force/distance characteristic generally behaves in accordance with a square law over the actuating movement.

The armature is in general guided by a separate guide sleeve, which is designed to be non-magnetic, within the coil arrangement. The gap which is generally in the form of an annular gap between the armature and the magnetic return path device also has a significant influence on the effectiveness or the efficiency of the switching magnet. If a non-magnetic guide sleeve is arranged in the clearance air gap, the magnetic characteristics become worse.

In the case of operating arrangements for operation of a valve arrangement, it is on the one hand possible to directly couple a valve control element to a valve slide.

However, valve arrangements also exist in which a valve control lever can be pivoted between a first valve position (first sealing position) and a second valve position (second sealing position).

During operation of valve arrangements such as these, it is particularly difficult to match the actuating movement of the linear actuator that is used to move the lever between the first and the second valve position.

Furthermore, one situation that frequently arises with valve arrangements such as these is that sealing elements for the valve control lever are plastically deformed over time by the valve seat. This results in the sealing effect deteriorating over the course of time.

SUMMARY OF CERTAIN INVENTIVE ASPECTS

Embodiments have an improved electromagnetic actuator which, in particular, offers higher efficiency, as well as an improved operating arrangement for operation of a valve arrangement.

BRIEF DESCRIPTION OF THE DRAWINGS

Certain embodiments of the invention will be explained in more detail in the following description and are illustrated in the drawings, in which.

DETAILED DESCRIPTION OF CERTAIN INVENTIVE EMBODIMENTS

Figure 1:
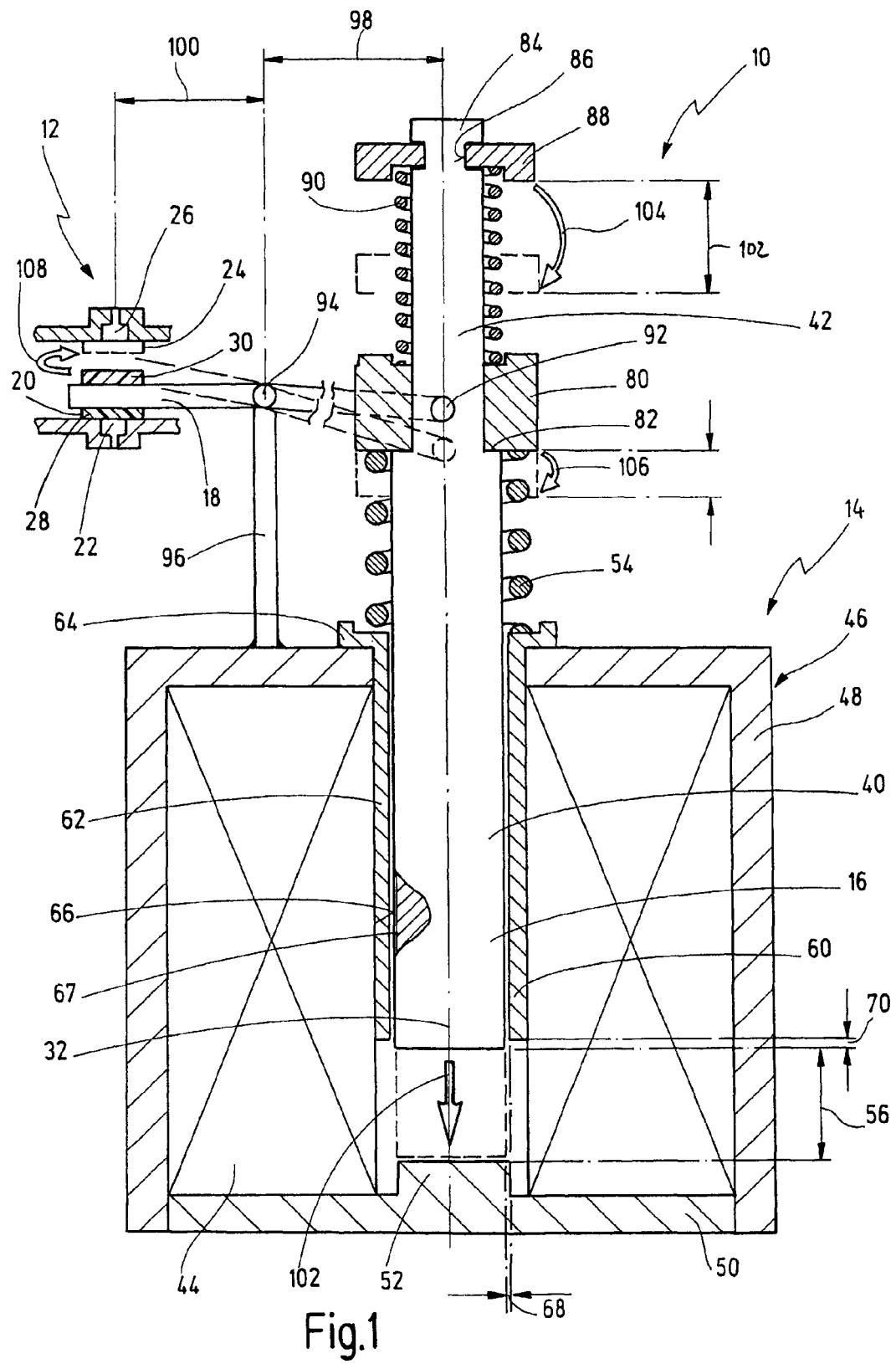
FIG. 1 shows a schematic longitudinal section view of an operating arrangement for a valve arrangement according to one embodiment.

In FIG. 1, one embodiment of an operating arrangement is annotated 10, in general. Various modifications of the features of the presented embodiment may be made without departing from the inventive characteristics thereof.

The operating arrangement 10 is used to operate a valve arrangement, which is shown schematically at 12, and has a linear actuator in the form of an electromagnetic actuator 14 according to the invention.

The electromagnetic actuator 14 is in the form of a switching magnet. The armature of the electromagnetic actuator 14 is in the form of a valve control element 16 and may comprise a soft magnetic material. The valve control element 16, which can be moved in the axial direction with the electromagnetic actuator 14, is coupled to a valve control lever 18. The valve control lever 18 can move between a first valve position 20 and a second valve position 24. In the first valve position 20, a first sealing element 28 rests on a first valve seat 22 of the valve arrangement 12. In the second valve position 24, a second sealing element 30, which is fixed to the valve control lever 18 opposite the first sealing element 28, rests on a second valve seat 26 of the valve arrangement 12.

The longitudinal axis along which the valve control element 16 can be moved is shown at 32 in FIG. 1.

The valve control element 16 has an armature section 40 and an operating section 42. Furthermore, the electromagnetic actuator 14 has a coil arrangement 44 into which the armature section 40 is inserted in the form of a plunger-type armature. The operating section 42 projects beyond the coil arrangement 44. By way of example, the coil arrangement 44 is in the form of a simple wound coil.

A magnetic return-path device 46 composed of magnetic material is arranged around the coil arrangement 44. The magnetic return-path device 46 has a pot 48, which surrounds the external circumference of the coil arrangement 44 and covers a first axial end face of the coil arrangement 44, facing the operating section 42.

Furthermore, the magnetic return-path device 46 has a cover 50, which covers the second opposite axial end face of the coil arrangement 44 and extends over it. The cover 50 has an attachment 52 which projects from the second end face into the coil arrangement 44, and forms a magnet core.

The valve control element 16 is prestressed in a rest position with first spring 54. In the rest position, the coil arrangement 44 is not electrically excited, and thus does not exert any force on the armature section 40.

When the valve control element 16 is in the rest position, a working air gap 56, which is equal to the working travel of the valve control element 16, is formed between one end face of the armature section 40 and one end face of the attachment 52.

Furthermore, a guide sleeve 60 is positioned in the longitudinal opening (which is aligned with the longitudinal axis 32) in the coil arrangement 44. The guide sleeve 60 has a guide section 62 which is fixed in the coil arrangement 44 and surrounds a significant portion or the majority of the armature section 40.

The guide sleeve 60 also has a flange section 64 which is connected to the guide section 62 and projects beyond the coil arrangement 44. To be more precise, the flange section 64 projects beyond the pot 48 and forms a supporting holder for the first spring means 54, which in the present case are in the form of a helical compression spring.

The guide section 62 is hollow-cylindrical and surrounds the cylindrical armature section 40. The cross-sectional shapes of the guide section 62 and of the armature section 40 are in each case matched to one another.

An outer surface 66 of the armature section 40 (and possibly also of the operating section 42) is coated with a low-friction coating 67, for example with Teflon®.

An annular or hollow-cylindrical clearance air gap 68 is formed between the outer circumference of the armature section 40 and the inner circumference of the guide section 62.

The width of the clearance air gap 68 is generally less than 0.1 mm, and preferably less than 0.05 mm.

The distance between the end face of the armature section 40 and the attachment 52 (the working air gap 56) is less than the distance between the attachment 52 and the end of the guide sleeve 60.

According to the invention, the guide sleeve 60 is composed of a magnetic material, such as magnetic stainless steel. The clearance air gap 68 can be kept very small, as stated above. As a result of the fact that the guide sleeve 60 does not enter the coil arrangement 44 as deeply as the armature section 40 (the distance between the attachment 52 and the guide sleeve 60 is greater than the working air gap 56), this makes it possible to prevent a magnetic short between the guide sleeve 60 and the cover 50.

The operating section 42 of the valve control element 16 has a first section around which the first spring 54 is arranged in the form of a helical compression spring, and a second section with a smaller diameter. A slide 80 is mounted such that it can move in the axial direction on the section with the smaller diameter.

In a slide basic position as shown in FIG. 1, the slide 80 rests on a shoulder 82, which forms the transition between the thicker section and the thinner section of the operating section 42.

A circumferential groove 86 is provided at one free end 84 of the operating section 42, and a radially projecting disc 88 is fixed on it.

Second spring means 90 in the form of a second helical compression spring are arranged between the disc 88 and the slide 80. The second spring 90 prestresses the slide 80 in general in the direction towards the shoulder 82, so that the slide 80 in general rests on it in a basic position.

The slide 80 is also coupled via a coupling (an articulated joint) 92 to the valve control lever 18.

Furthermore, the valve control lever 18 is mounted with a bearing 94 in an area between the slide 80 and the valve arrangement 12. The bearing 94 is fixed to the housing, as is shown by a schematically indicated strut 96.

The length 98 between the joint 92 and the bearing 94 is considerably greater than the length 100 between the bearing 94 and the valve arrangement 12 (the valve seats 22, 26).

The working travel of the valve control element 16 is shown at 102 and corresponds to the length of the working air gap 56. The working travel of the disc 88 is identical to this.

The working travel of the slide 80 is shown at 106, and the working travel of the valve control element 18 is shown at 108 in the area of the valve seats 22, 26.

The operating arrangement 10 operates as follows.

In the basic position as illustrated by solid lines in FIG. 1, the slide 80 is prestressed against the shoulder 82 with the second spring 90. The first spring 54 acts on the slide 80, from the opposite side. The second spring 90 in this case exerts a greater force than the first spring 54, so that the valve control element 16 is, overall, forced out of the coil arrangement 44 with the first spring 54. The contact force is transmitted via the valve control lever 18 to the first sealing element 28 which, in this position, is forced by the first spring 54 against the first valve seat 22. Because of the lever effect (length 98 with respect to the length 100), the first sealing element 28 is pressed against the first valve seat 22 with a comparatively large force, in order to achieve reliable sealing.

When the coil arrangement 44 is supplied with power, or excited, the valve control element 16 is pulled into the coil arrangement 44, bridging the working air gap 56, until the end face of the armature section 40 strikes the end face of the attachment 52. During this process, the first spring 54 is compressed. Since the second spring 90 is stronger (has a greater spring constant) than the first spring 54, the slide 80 is firstly driven with the second spring 90 in this case, and the valve control lever 18 is moved such that the sealing element 28 is lifted off the first valve seat 22.

As the movement of the valve control element 16 continues, the second sealing element 30 strikes the second valve seat 26. This happens before the working air gap 56 is bridged completely. The valve control element 16 is thus moved further, but the slide 80 remains substantially stationary because of the force being exerted by the second spring 90 on the slide 80. Accordingly, the second sealing element 30 is pressed against the second valve seat 26—by the lever effect of lever 98/100.

In one example, the valve arrangement 12 may be part of a directional control valve for an arrangement for nitrogen-oxide reduction, that is to say it may be suitable, for example, for carrying urea.

The large-area guidance of the magnetic valve control element 16 in the guide sleeve 60, which is likewise magnetic, allows the clearance air gap 64 to be made very small. Furthermore, the lines of force are distributed over a very large area, so that, overall, very large forces can be exerted on the armature section 40. Furthermore, the more exact guidance prevents sticking, as can occur in the prior art by tilting of the valve control element and being pulled against the pot at the side.

Figure 2:
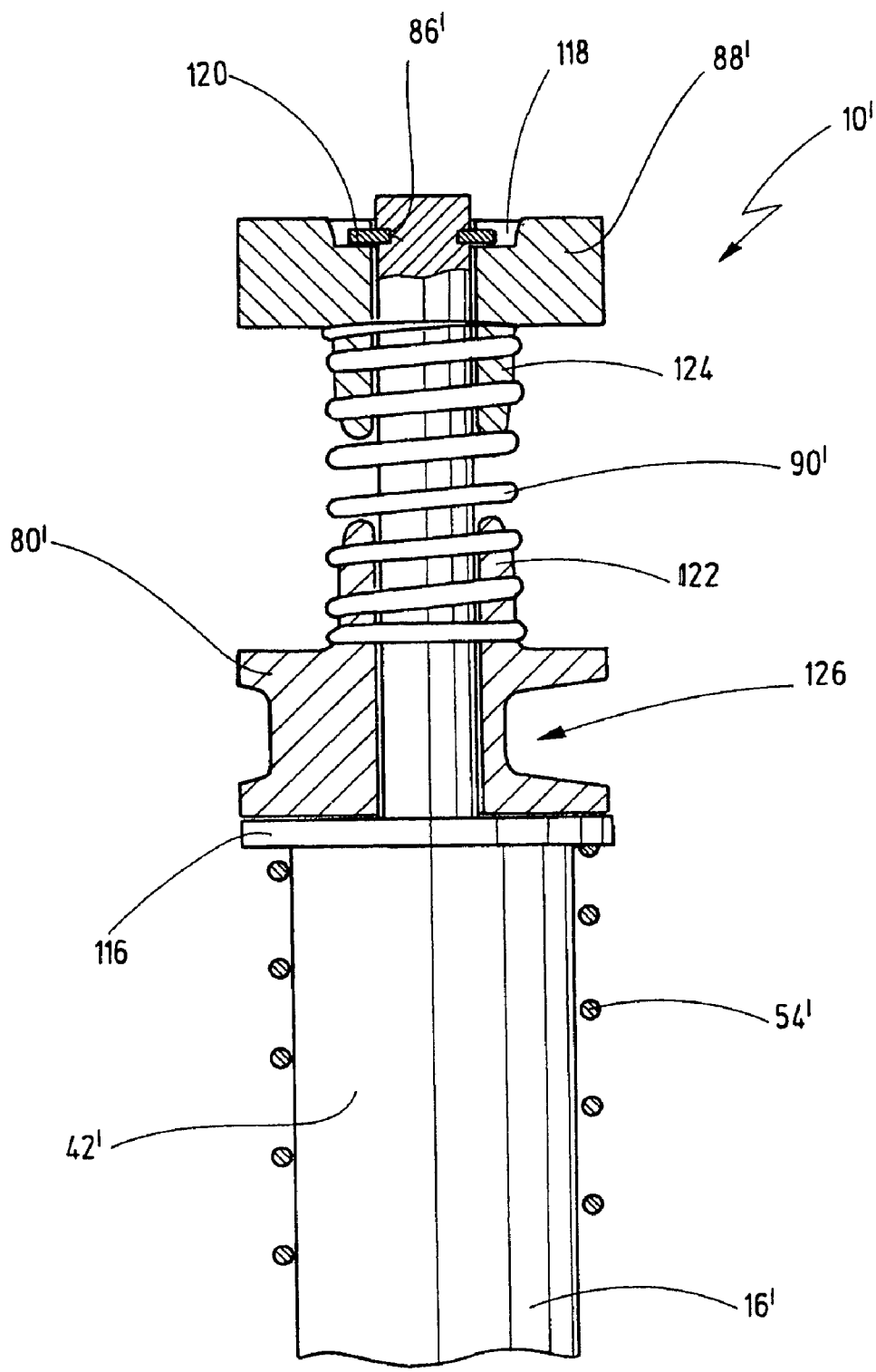
FIG. 2 shows a schematic longitudinal section view of another embodiment of an operating arrangement.

FIG. 2 shows an alternative embodiment of an operating arrangement 10' according to the invention. The design and method of operation of the operating arrangement 10' correspond in general to those of the operating arrangement 10 shown in FIG. 1.

In the operating arrangement 10', the valve control element 16' is forced by the first spring 54' to a rest position, in which the first spring 54' does not act on the slide 80' but on a flange section 116 on the valve control element 16'.

This makes it possible to match the forces exerted by the first spring 54' and the forces exerted by the second spring 90' on the slide 80' and thus on the valve control lever 18, thus resulting in substantially the same contact pressure on both valve seats 22, 26.

In the operating arrangement 10', the slide 88' is furthermore fixed to the valve control element 16' by a locking washer 120. To be more precise, in this embodiment, the disc 88' has a recess 118 on its side facing away from the second spring means 90'. The locking washer 120 can be pushed essentially without any forces into a circumferential groove 86' in the valve control element 16'. This can be done when the disc 88' compresses the second spring means 90' sufficiently to expose the circumferential groove 86'. The disc 88' then snaps back, so that the locking washer 120 is located in the recess 118, and is secured against falling out of the circumferential groove 86' again at the side.

Furthermore, in the operating arrangement 10', respective spring guide sections 124 and 122 are provided in each case both on the disc 88' and on the slide 80', and are used to guide the second spring 90', in the form of a helical compression spring.

Furthermore, it is possible for the slide 80', the second spring 90' and the disc 88' to be installed in advance as a unit, which is then fitted to the valve control element 16' during final assembly, as described above.

Finally, the slide 80' has a holder 126 whose longitudinal section is approximately in the form of an hourglass (only one side of which is shown in FIG. 2).

The holder 126 is suitable for holding a section, in the form of a fork, of a valve control lever 18, which is then driven without friction during movements of the slide 80', by virtue of the configuration of the holder 126. The relative tilting of the valve control lever 18 is in this case absorbed via the conically tapering sections of the holder 126, which is in the form of an hourglass.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. All changes which come within the meaning and range of equivalency of the claims are to be embraced within their scope.

What is claimed is:

1. An electromagnetic actuator configured to operate a valve arrangement, the actuator comprising
    a valve control element configured to be moved by a linear actuator in the axial direction between a first actuating position and a second actuating position; and
    a valve control lever coupled to the valve control element and to the valve arrangement, wherein the valve control lever is configured to move between a first valve position and a second valve position, wherein the valve control lever is coupled to the valve control element via a slide which is mounted such that the slide can be moved in the axial direction on the valve control element, wherein the slide is prestressed in the first actuating position such that the valve control lever is forced to the first valve position, and wherein the slide is configured to be moved to the second actuating position such that the valve control lever is forced to the second valve position.

2. The electromagnetic actuator according to claim 1, wherein the valve control element is prestressed to the first actuating position by a first spring.

3. The electromagnetic actuator according to claim 2, wherein the first spring is configured to act directly on the valve control element.

4. The electromagnetic actuator according to claim 2, wherein the first spring is supported on a flange section of a guide sleeve fixed to a housing of the linear actuator.

5. The electromagnetic actuator according to claim 1, wherein the slide is prestressed to a slide basic position with respect to the valve control element by a second spring in the first actuating position of the valve control element.

6. The electromagnetic actuator according to claim 5, wherein the valve control element is prestressed to the first actuating position by means of the first spring means, wherein the first spring is configured to act on the slide from one side in the axial direction, and wherein the second spring is configured to act on the slide from the opposite side in the axial direction.

7. The electromagnetic actuator according to claim 5, wherein the valve control element is prestressed to the first actuating position by the first spring, wherein the second spring is stronger than the first spring, and the slide is forced to the slide basic position against a stop on the valve control element.

8. The electromagnetic actuator according to claim 5, wherein the second spring is supported on a projection at a free end of the valve control element.

9. The electromagnetic actuator according to claim 8, wherein the projection is formed by a disc which is fixed on a circumferential groove in the valve control element.

10. The electromagnetic actuator according to claim 9, wherein the disc has a recess configured to hold a locking washer on the side facing away from the second spring, wherein the locking washer may be inserted essentially without any force from the side into the circumferential groove in the valve control element.

11. Operating arrangement according to claim 1, wherein at least one of the slide and the disc is provided with spring guide attachments configured to guide the second spring.

12. The electromagnetic actuator according to claim 1, wherein the slide has a holder comprising a longitudinal section having an approximately hourglass shape, and configured to couple to the valve control lever.

13. The electromagnetic actuator according to claim 1, wherein the valve control element is connected to an armature of the electromagnetic actuator.

14. The electromagnetic actuator according to claim 1, comprising:
    a coil arrangement configured to be excited electrically;
    an armature mounted such that it can move axially in the coil arrangement, wherein the armature is formed from a soft magnetic material and configured to move in the axial direction when the coil arrangement is excited; and
    a guide sleeve, fixed in the coil arrangement and configured to guide the armature in the axial direction, wherein the armature is connected to the valve control element.

15. The electromagnetic actuator according to claim 14, wherein the guide sleeve is formed from a soft magnetic material and wherein the armature is coated at least in the area of its outer surface by which it is guided in the guide sleeve, with a coating which reduces friction.

\* \* \* \* \*